United States Patent [19]

Ferree et al.

[11] Patent Number: 4,577,127
[45] Date of Patent: Mar. 18, 1986

[54] LIGHTWEIGHT ELECTRIC ROBOTIC ACTUATOR

[75] Inventors: Herbert E. Ferree, Greensburg; Thomas R. Wagner, Monroeville; Michael D. Hecht, West Mifflin; Thomas J. Donnelly, Monroeville, all of Pa.

[73] Assignee: Westinghouse Electric Corp., Pittsburgh, Pa.

[21] Appl. No.: 563,912

[22] Filed: Dec. 21, 1983

[51] Int. Cl.$^4$ .............................................. H02K 7/06
[52] U.S. Cl. ..................................... 310/83; 310/112; 310/64
[58] Field of Search ................. 310/112, 82, 83, 80, 310/77, 115, 118, 266, 65, 63, 62, 64

[56] References Cited

U.S. PATENT DOCUMENTS

| | | | |
|---|---|---|---|
| 4,266,152 | 5/1981 | Herr et al. | 310/64 X |
| 4,398,110 | 8/1983 | Flinchbaugh et al. | 310/83 |
| 4,419,597 | 12/1983 | Shiga et al. | 310/64 X |
| 4,437,030 | 3/1984 | Coquillart | 310/64 X |

Primary Examiner—Donovan F. Duggan
Attorney, Agent, or Firm—D. M. Satina

[57] ABSTRACT

An improved electric actuator is provided, having in association therewith a resolver. The actuator includes a stationary and a rotatable housing, and an electric motor within it. The electric motor drives the rotary housing through a speed reducing harmonic drive mechanism. The actuator has an opening in the rotary housing, and a cavity inwardly of the opening having a mating anchoring element connected with the stationary housing. A modular resolver is provided, of a shape and size to have a major portion of it occupy the cavity provided in the actuator, and having a mating part for engaging the mating part of the stationary housing, upon assemblage of the resolver to the actuator. A rotatable part of the resolver is secured to the rotary housing. A heat dissipation system is provided, including a fan mounted on a rotary member of the actuator and a closed circuit for the passage of air between the fan and a heat conductive plate forming a part of the stationary housing. Stability for the rotary housing is provided by widely spaced ball bearings supporting a rotary shaft extending from the rotary housing, the ball bearings being located at the maximum axial spacing within the stationary housing. In addition, an electromagnetic brake of lightweight construction is provided to prevent rotation of the rotary housing, and the resolver includes a coupling of the bellows type for elastic isolation from distortion of the parts, due to stresses between the fixed and rotary parts of the resolver.

14 Claims, 6 Drawing Figures

LIGHTWEIGHT ELECTRIC ROBOTIC ACTUATOR

BACKGROUND OF THE INVENTION

This invention relates to electric actuators, and more particularly to a high torque-to-weight ratio electric actuator for use in robotic systems, and including a resolver.

Robotic systems are used to reduce or eliminate the utilization of humans in certain industrial operations. Robotic systems are provided for the purposes of increasing productivity and of performing functions in hazardous environments, or locations where there is limited access, these situations either making manual operations hazardous or impossible. One application for robotic systems is in the repair or maintenance of nuclear reactor power plants, where the environment is radioactive, and human workmen may not occupy such environments, or may do so only for very limited periods of time, in order to limit the radiation exposure to the workmen.

In robotic arm systems, it is possible to place the actuators either away from the arm joints, driving them by such mechanisms as chains or belts or to place the actuators directly at each joint. The latter arrangement decreases the compliance of the arm, but reduces the arm load capability due to the added weight of the actuator on the arm. Remotely placed actuators, on the other hand, while reducing the weight of the arm, increase compliance and the inaccuracy of the arm's movement. Consequently, actuators located in the arms should not only be lightweight, but should provide high torque output. Hydraulic actuators previously used have provided high torque, but prior to the present invention, electric actuators were not used because they could not match the torque-to-weight ratios of the hydraulic actuators. Hydraulic systems are known to be more difficult to control, and where there is a vane type hydraulic system provided, it is not capable of continuous rotation. Hydraulic systems must have associated with them, in addition, such peripheral equipment as pumps and accumulators and there is the possibility of contamination of the hydraulic fluid, when used in hazardous environments.

Further, electric powered actuators for robotic applications, as in nuclear power plant servicing, must satisfy additional requirements. The position of the parts of the actuator must be able to be sensed, and where an electrical position sensor, such as a resolver, is used, it should be readily installed and replaced, in modular manner. Further, rigidity of the actuator and precision are required, as well as effective heat dissipation and braking.

SUMMARY OF THE INVENTION

An improved electric actuator is provided, having in association therewith a resolver. The actuator includes a stationary and a rotatable housing, and an electric motor within it. The electric motor drives the rotary housing through a speed reducing harmonic drive mechanism. The actuator has an opening in the rotary housing, and a cavity inwardly of the opening having a mating anchoring element connected with the stationary housing. A modular resolver is provided, of a shape and size to have a major portion of it occupy the cavity provided in the actuator, and having a mating part for engaging the mating part of the stationary housing, upon assemblage of the resolver to the actuator. A rotatable part of the resolver is secured to the rotary housing. A heat dissipation system is provided, including a fan mounted on a rotary member of the actuator and a closed circuit for the passage of air between the fan and a heat conductive plate forming a part of the stationary housing. Stability for the rotary housing is provided by widely spaced ball bearings supporting a rotary shaft extending from the rotary housing, the ball bearings being located at the maximum axial spacing within the stationary housing. In addition, an electromagnetic brake of lightweight construction is provided to prevent rotation of the rotary housing, and the resolver includes a coupling of the bellows type for elastic isolation from distortion of the parts, due to stresses between the fixed and rotary parts of the resolver.

BRIEF DESCRIPTION OF THE DRAWINGS

While the specification concludes with claims particularly pointing out and distinctively claiming the subject matter of the invention, it is believed the invention will be better understood from the following description, taken in conjunction with the accompanying drawings wherein:

DESCRIPTION OF THE PREFERRED EMBODIMENT

The present invention, as described herein, provides an electric actuator in combination with a resolver, for use in robotic arm systems, and is provided with provision for readily replacing the resolver, with an internal closed cycle air cooling system and with bearings providing support against wobbling and axial movement; an electromagnetic brake is also provided.

Figure 1:
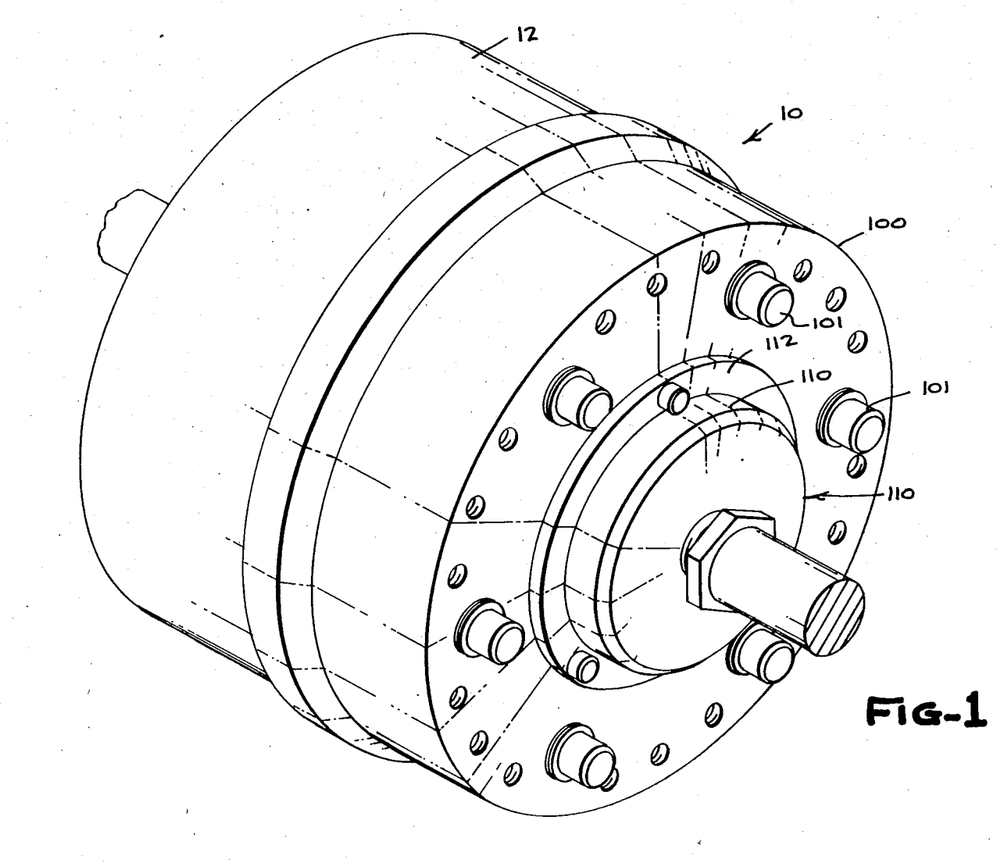
FIG. 1 is a perspective view of the improved lightweight electric robotic actuator.

Referring now to the drawings, FIG. 1 is a perspective view of a lightweight electric robotic actuator 10 in accordance with the present invention, comprising a stationary housing 12 and a rotary housing 100. A plurality of bolts 101 extend from housing 100. A resolver 110 extends from housing 100.

Figure 2:
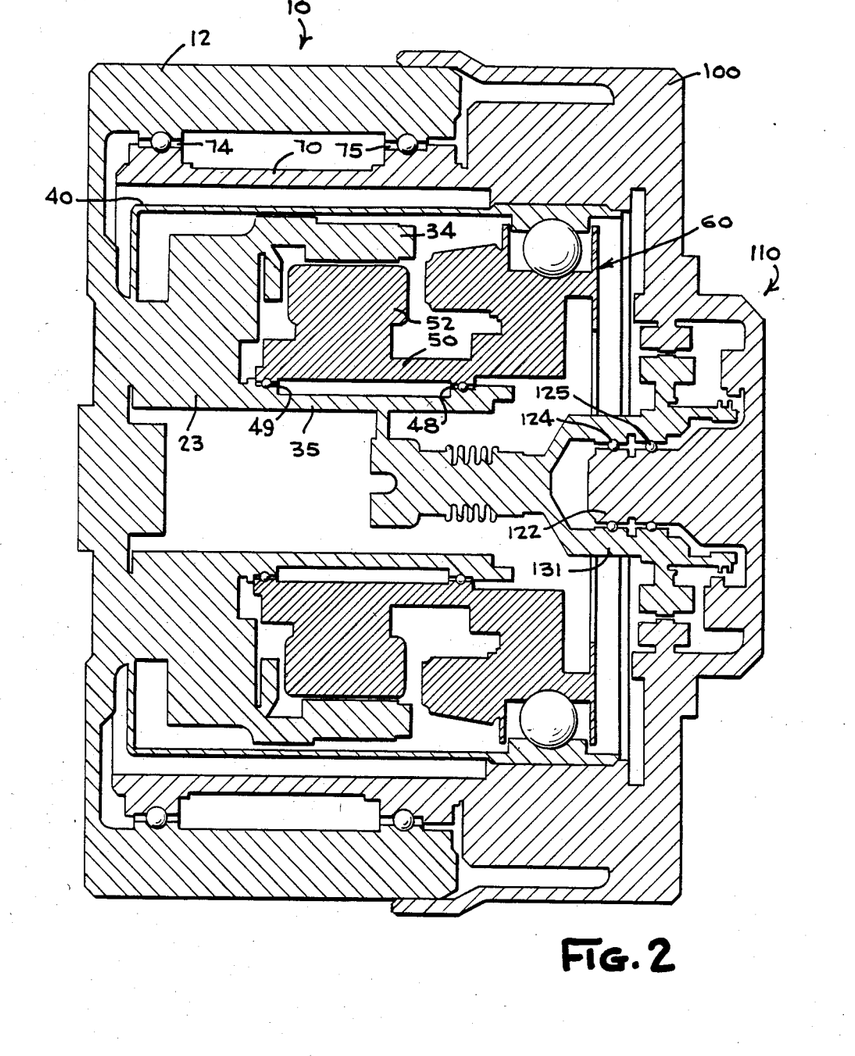
FIG. 2 is a schematic cross-sectional view illustrating the stationary and rotary parts of the electric actuator.

In the following discussion, in order to make the disclosure readily understandable, reference is made preliminarily to FIG. 2, wherein those parts which are cross hatched in one direction are fixed relative to each other, and those parts which are cross hatched in the opposite direction are fixed relative to each other and rotate relative to the other parts. Thus, there is shown in FIG. 2 an electric robotic actuator 10 which includes a stationary housing 12, having therewithin a support 23 and an axially extending, stationary hollow shaft 35. A rotary housing 100 is provided, which is generally in facing relationship to stationary housing 12, a hollow rotary shaft 70 extending from the rotary housing 100, with ball bearings 74 and 75 supporting the hollow rotary shaft 70 and hence the rotary housing 100 on the stationary housing 12. An electric motor including a stator 34 and rotor 52 is provided, rotor 52 being carried by a rotor ring 50, journaled on the hollow shaft 35 by bearings 48 and 49. A harmonic drive mechanism 60 includes a stationary deep cup harmonic drive member 40, and serves to provide a speed reduction coupling between the rotor ring 50 and the rotary housing 100. Mounted on rotary housing 100 is a resolver 110, having a rotary shaft 122 which is rotatably supported by ball bearings 124 and 125 carried by a hollow shaft 131 of the resolver 110.

Figure 3:
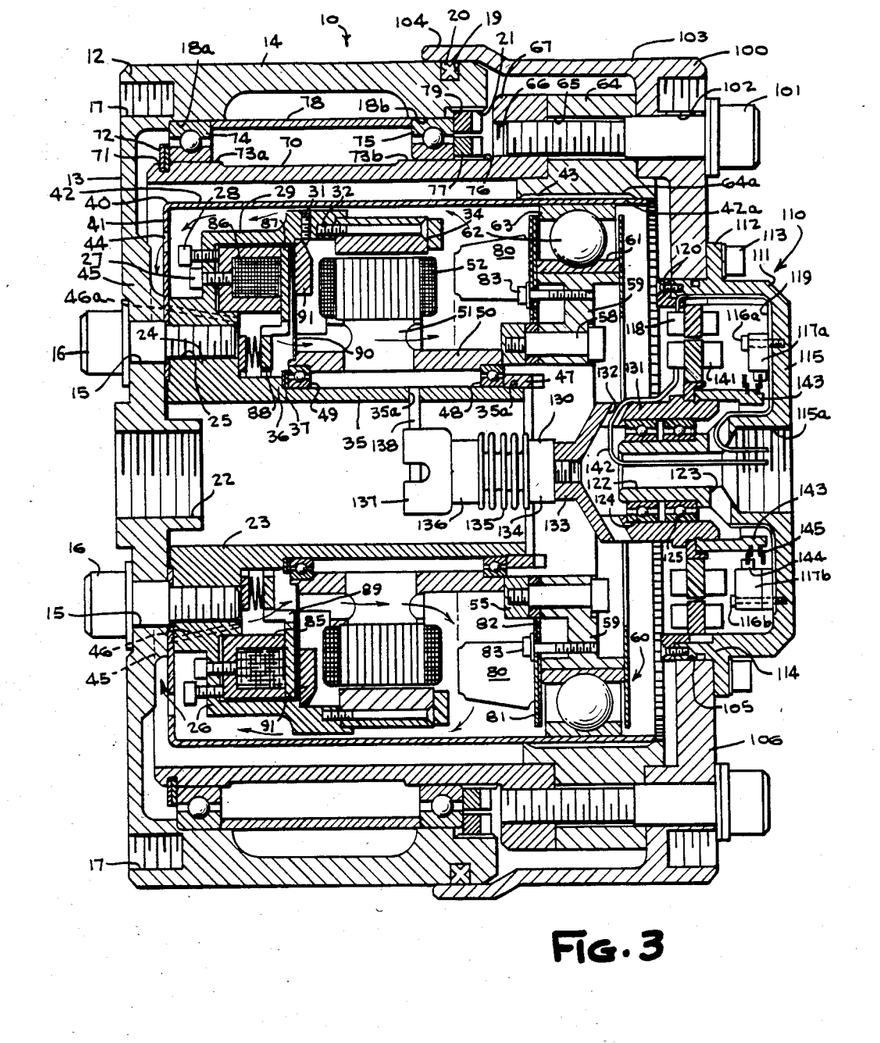
FIG. 3 is an axial cross-sectional view of the electric actuator and resolver.

Referring now to FIG. 3, the stationary housing 12 has a back plate 13, and a cylindrical portion 14. Back plate 13 is heat conductive and is provided with a plurality of openings 15, arranged in a circle, for receiving bolts 16. The back plate 13 is also provided with threaded bores 17 for attaching the stationary housing 12 to a suitable part of a robot, or other element.

The cylindrical portion 14 is provided with a pair of lands 18a and 18b, located adjacent to the back plate 13 and adjacent to the open end thereof. At its outer end, the cylindrical portion 14 is provided with an outer peripheral groove 19 having a seal 20, and with internal threads 21; the back plate 13, at its center, is provided with an opening 22.

Within the stationary housing 12 there is provided a support 23 including a peripherally extending flange 24 having threaded openings 25 therein, in which are engaged the bolt 16. A radial flange 26 extends from the flange 24, having brake supporting screws 27 and brake positioning screws 28 extending therethrough. A cylindrical portion 29 extends forwardly from the flange 26 having a plurality of radially extending retaining screws 31 therein. In its end face, the cylindrical portion 29 has a threaded hole 32 for receiving a stator retaining screw 33 which extends through a stator 34 of a motor.

The support 23 also includes hollow shaft 35 having a shoulder 36 against which are a pair of abutment rings 37.

A deep cup harmonic drive member 40 is provided, having a back plate 41 and a cylindrical portion 42 having external splines 43 at its outer end, the back plate 41 having an air flow opening 44 therein. As will be understood, a circular array of the air flow openings 44 are provided in the member 40. The member 40 is clamped between the inner face of the back plate 13 and the support 23 by the bolts 16. A plurality of radially extending passages 45 are provided in the interior of the back plate 13, and communicate with generally axially extending passages 46 through the flange 24; passage 46 is in registry with an opening 46a in the member 40. In this way, communication is had between a chamber outwardly of the cylindrical portion 29 of support 23 and inwardly of the cylindrical portion 42 of member 40, on the one hand, and a chamber inwardly of the cylindrical portion 29, on the other hand.

The outer end of the hollow shaft 35 is provided with external screw threads 35a. A nut 47 is threaded on the end of hollow shaft 35, and engages the inner race of a ball bearing 48. Ball bearing 48 supports one end of a rotor ring 50, the other end of which is supported by a ball bearing 49; the ball bearing 49 is engaged with a retaining ring 37, and shoulders on the rotor ring 50 determine the positions of ball bearings 48 and 49 thereon. The rotor ring 50 has spaced radial bosses 51, providing passages between them, the bosses supporting a rotor 52 radially inwardly of stator 34.

Figure 4:
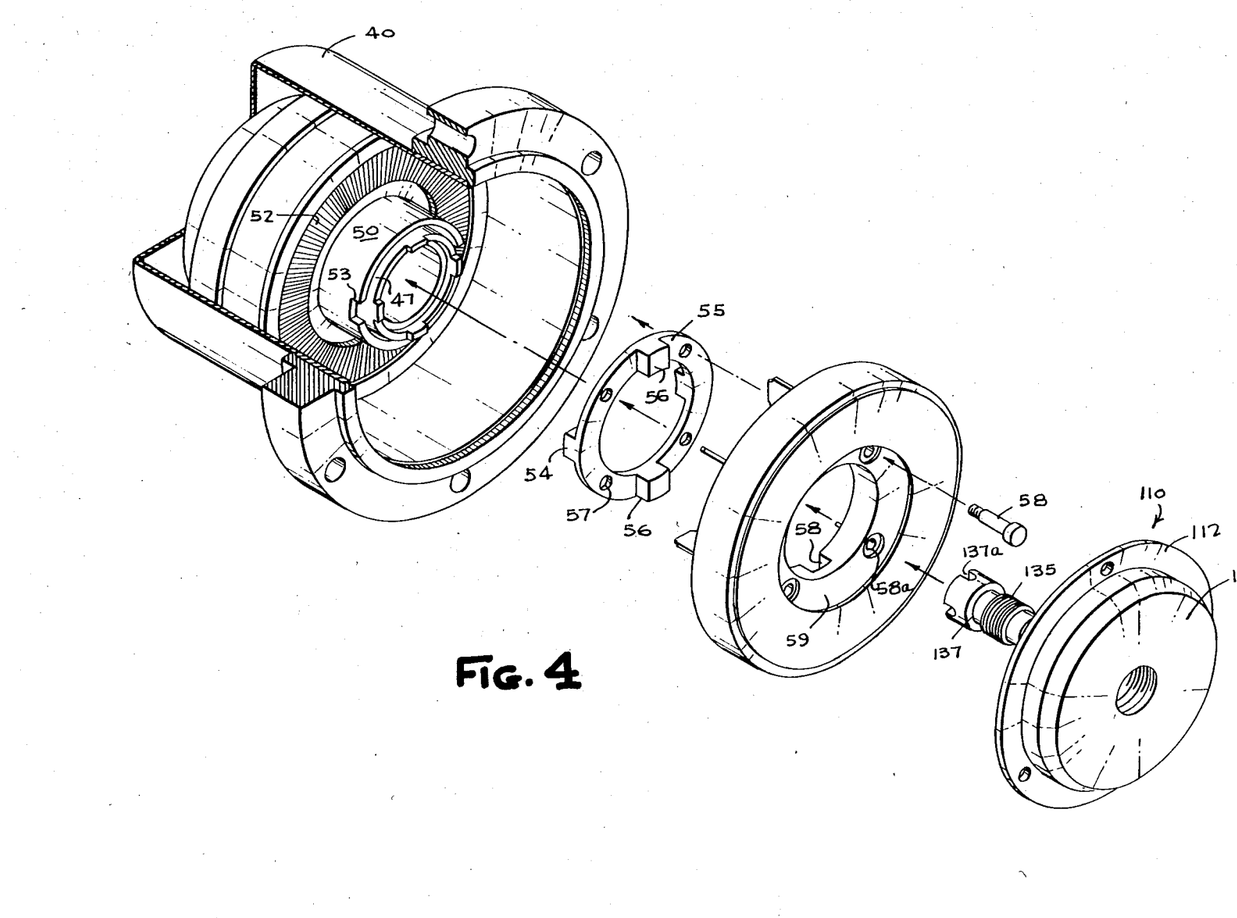
FIG. 4 is an exploded perspective view of the actuator and resolver, with parts in section of part of the actuator.

Shown in FIG. 4 is the deep cup harmonic drive member 40 and rotor 52, with the rotor ring 50 extending therefrom. Rotor ring 50 has a pair of keyways 53 therein which receive keys 54 of an Oldham coupling ring 55, having keys 56 on the face thereof opposite to that from which the keys 54 extend. The ring 55 is provided with threaded holes 57 which receive bolts 58. The keys 54 engage in the keyways 53, thereby effecting rotation of the coupling ring 55, and the keys 56 engage in keyways 58 of an annular wave generator 59 forming a part of the harmonic drive unit. The holes 58a for the bolts 58 are somewhat larger in diameter than the bolts 58, so that the wave generator 59 is free to move in a limited manner on the several bolts 58. The Oldham coupling 55 provides for transmission of torque from the rotor ring 50 to the wave generator 59, with provision for some misalignment between these parts.

The wave generator 59 is part of a harmonic drive mechanism 60 driven by the rotor ring 50, provided for transmitting rotary motion from rotor 52 to the rotary housing 100. Harmonic drive mechanism 60 comprises the wave generator 59, which is a drive member of the harmonic drive mechanism and has, in known fashion, an outside diameter of an elliptical configuration for generating a drive wave as the wave generator 59 is rotated about the axis of hollow shaft 35 by the rotor 52. A flexible ring 61 lies adjacent the wave generator 59, and a plurality of ball bearings 62 engage the ring 61, and an outer ring 63. The flexible drive provided by the rings 61 and 63 functions so that when the wave generator 59 is rotated, the elliptical configuration causes the inner flexible ring 61 and the outer flexible ring 63 to be flexed, thereby transmitting the elliptical wave generated by wave generator 59. The deep cup harmonic drive member 40 has external splines 42a on the cylindrical portion 42 on the outside thereof near its open end, radially outwardly of the ring 63. A rigid outer ring 64 has a spline 64a on the inner circumference thereof, which has teeth which mate with the teeth forming the splines 42a. Teeth of spline 64a are greater in number than teeth of spline 42a, so that these teeth will only mesh at two radially opposed points along their circumference, which points move along the circumference as outer ring 64 rotates about deep cup harmonic drive member 40. Since the wave generator 59 has an elliptical configuration, as it rotates, it causes the flexible ring 61 and flexible ring 63 to flex outwardly along the longest radius of the wave generator 59. The outward flexing of the outer ring 63 causes teeth of spline 42a of deep cup harmonic drive member 40 also to flex outwardly and into contact with the teeth of spline 64a. Because the teeth of splines 42a and 64a only mesh at two radially opposed points along their circumference, and since the rotation of harmonic wave generator 59 causes the point of mesh to move along the circumference, this interaction causes outer ring 64 to rotate around deep cup harmonic drive member 40 in the same direction as harmonic wave generator 59, but at a slower angular speed. The harmonic drive mechanism 60 thereby provides a means to transfer rotation from the rotor 52 to the rigid outer ring 64 at a reduced speed. Thus, low speed, high torque movement can be transmitted in this manner with a relatively compact, lightweight mechanism.

Annular grease shield plates 82 and 82a are on either side of the inner ring 61, ball bearings 62 and outer ring 63 to protect the ball bearings 62.

Circulation of air within the actuator 10 is provided by a plurality of fan blades 80 extending from an annular plate 81, having annular grease shield plate 82 adjacent to it, bolts 83 securing the annular plates 81 and 82 to the wave generator 59. Thus, the blades 80 rotate with the wave generator 59 and rotor ring 52, driving air, as shown by the arrows, outwardly of the stator 34, between stator 34 and the cylindrical portion 42 of the deep cup harmonic drive member 40, and through the opening 44 in back plate 41 of member 40. The air there strikes against the heat conductive back plate 13 of the stationary housing 12, transferring heat to it, and becoming cool. The air then passes into the radially extending passages 45 in back plate 13, through openings 46a in member 40, and through axially extending passages 46 through the flange 24. The air then continues in its closed circuit, passing inwardly of the rotor 52, between the radially spaced bosses 51, and then back to the fan blades 80, for recirculation. Thus, heat generated by the drive mechanism 60, bearings, the electric motor and/or other elements of the apparatus is dissipated.

Rigid outer ring 64 is provided with a plurality of axially extending openings 65, through each of which passes a bolt 101 of lessor diameter than the opening 65. Bolt 101 is threaded into an opening 66 in a flange 67 on an end of hollow rotary shaft 70. Shaft 70 has a groove 71 near its end opposite the flange 67, in which are a pair of retaining rings 72. A pair of spaced lands 73a and 73b are located radially inwardly of the lands 18a and 18b, respectively, and a pair of ball bearings 74 and 75 are in engagement with these lands. Adjacent the flange 67, the rotary hollow shaft 70 is provided with threads 76, being threadedly engaged by a nut 77, which is also engageable with the inner race of ball bearing 75. A cylindrical spacer 78 is provided between the ball bearings 74 and 75, and a nut 79 is in threaded engagement with the threads of threaded opening 21 of the stationary housing 12.

The bolt 101 passes through an opening 102 in the rotary housing 100, and serves to clamp in assembled relationship the hollow shaft 70, the rigid outer ring 64 and the rotary housing 100. Consequently, rotary motion imparted to the rigid outer ring 64 will effect rotation of rotary housing 100, which will be supported not only by the harmonic drive mechanism 60 and hollow shaft 35, but also by the engagement of hollow shaft 70 with ball bearings 74 and 75 carried in the stationary housing 12. Due to the wide spacing of the ball bearings 74 and 75, great stability is provided, so that the entire structure rotates accurately, while being of light weight. Not only wobbling motion is prevented, or significantly reduced, but in addition, axial movement is substantially eliminated.

The rotary housing 100 comprises a cylindrical portion 103 with an enlarged end 104, the interior of which is in sealing engagement with the seal 20 in groove 19 of stationary housing 12.

A resolver 110 is associated with the actuator 10 extending into a cavity within it defined by such internal parts as harmonic drive 60 and shaft 35. The resolver 110 is known in the art, being a variable transformer type of angular position sensor which is very accurate. The voltage outputs vary according to the angular position of the rotor and stator, both of which are toroidally wound. Resolver 110 includes a bell-shaped rotary housing 111 having an outstanding flange 112 through which pass fastening bolts 113 to secure the rotary housing 111 to the rotary housing 100, and concentrically with it. The housing 111 includes cylindrical portion 114 which extends through an opening 105 centrally located in back plate 106 of the rotary housing 100, and into a cavity within the actuator 10. On the interior of back plate 115 of rotary housing 111 there are secured, as by screws 116a and 116b, switches 117a and 117b; the cylindrical portion 114 of rotary housing 111 carries on the interior thereof a winding 118, to which a conductor 119 is connected, conductor 119 being held in position by a retaining ring 120.

The back plate 115 is provided at its central part with a threaded recess 115a, and extending from the back plate 115 is a hollow shaft 122 having radial openings 123 therein, the conductor 119 passing through the opening 123 into the recess 116. The shaft 122, being integral with back plate 115, provides a firm base for the mounting of the entire rotary housing 111 by means of the ball bearings 124 and 125. Epoxy in recess 115a prevents entry of moisture, etc., into the actuator 10.

A pair of ball bearings are supported on the hollow shaft 122, and rotatably support rotary member 130 of resolver 110. Rotary member 130 includes a hollow shaft 131, the interior of which is in engagement with the outer races of the ball bearings 124 and 125. Hollow shaft 131 is provided with radial openings 132, and is connected to a smaller diameter shaft 133, which is hollow, and to which is connected a collar 134, connected by a metal bellows 135 to a collar 136. Collar 136 has an enlarged end 137 with notches 137a, into which an anchoring pin 138 extends in mating, non-rotational relationship. The notches 137a of collar 137 are arranged in perpendicular planes, as shown in FIG. 4. Pin 138 has its end extending into an opening 35a in hollow shaft 35. The metal bellows 135 provides elastic isolation of the resolver 110 from distortion due to stresses generated in the actuator. In addition, the bellows 135, which is of stainless steel, provides a zero backlash coupling which is elastically stiff in rotation, while remaining flexible in axial alignment, and acts as a compression spring to assure contact between the anchoring pin 138 and the notches 137a.

The hollow shaft 131 carries a stator winding 141 which is radially inward of the rotor winding 118, and has a conductor 142 connected to it, conductor 142 extending through the opening 132, and thence through hollow shaft 122 into the recess 115a.

A ring 143 mounted on the end of hollow shaft 131 carries a pair of cam rings 144 and 145 for engagement with the switches 117b and 117a, respectively. Cam rings 144 and 145 are modified split-type retainer rings, which are commercially available, and are formed as a flat helix. A camming notch is ground on the exterior surface of the rings 144 and 145 and they are placed in position in grooves in ring 143, being rotated to provide proper orientation. In the showing in FIG. 3, the rollers of the switches 117a and 117b will be seen to have entered into the notches in cam rings 144 and 145.

Figure 5A:
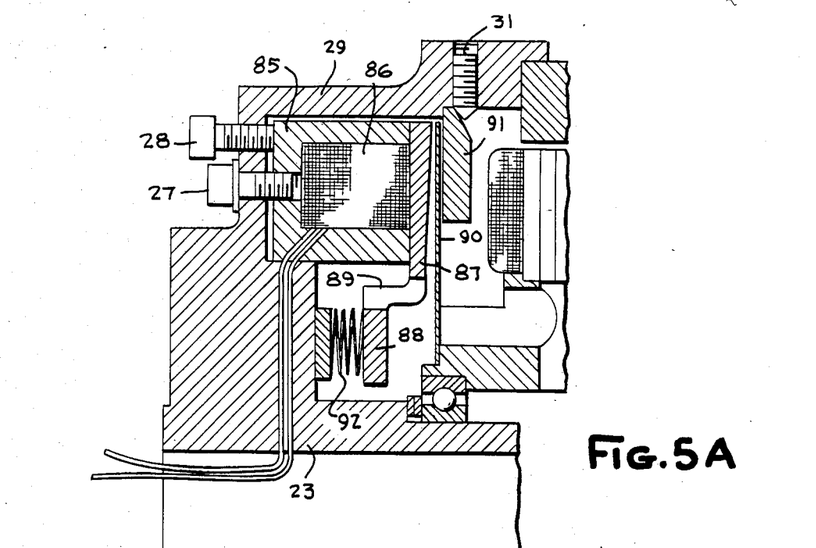
FIG. 5A and FIG. 5B are enlarged cross-sectional views showing an electromagnetic brake forming a part of the electric actuator.
Figure 5B:
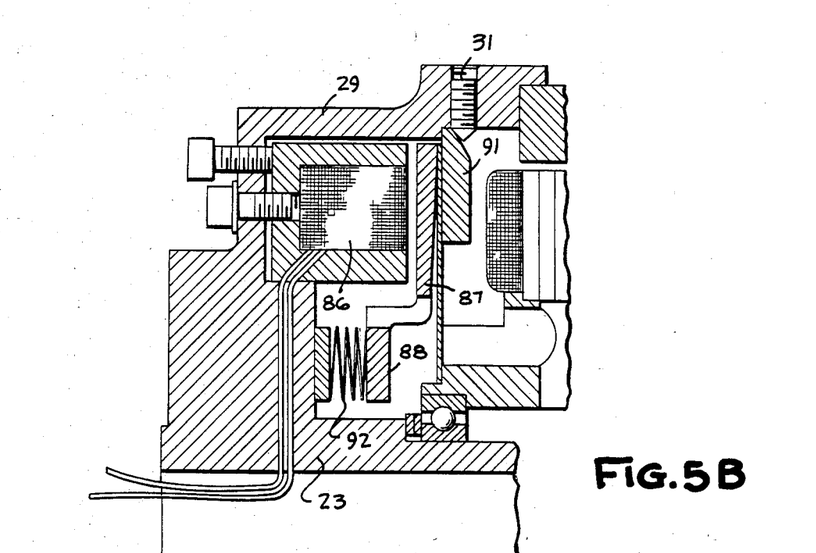

As shown in FIGS. 3, 5A and 5B, an electromagnetic brake is provided, comprising an annular channel 85 carried on support 23 by the brake support screws 27, and having their position determined by brake positioning screws 28. Within the channel 85 is a coil 86. An annular brake shoe plate 87 is supported axially adjacent to coil 86 and annular channel 85, and has an offset actuator ring 88, spaced connectors 89 extending generally axially, and connecting the brake shoe plate 87 with the actuator ring 88; between the connectors 89 are passages for the flow of air as hereinabove described. A brake disc 90 is mounted on rotor ring 50, extending in a radial plane, between the annular brake shoe plate 87 and a backup ring 91, which is held in position by the retaining screws 31 in the cylindrical portion 29 of support 23. Springs 92 engage the actuator ring 88, urging the annular brake shoe plate 87 against the brake disc 90, and urging it against the backup ring 91, in the braking position shown in FIG. 5B. The spring 92 is effective only when the coil 86 is deenergized, since when it is supplied with current, its field draws the brake shoe plate 87 to it, thus separating it from the brake disc 90; FIG. 5A shows the electromagnetic brake in the brake release position.

The resolver 110 may be assembled to the electric robotic actuator 10 as a unit, and accordingly may be removed therefrom, as a unit, and a replacement installed. This is accomplished by the above-described construction, in which the entire resolver 110 is assembled, being held together by the engagement of the races of ball bearings 124 and 125 with the shafts 122 and 131, the assembled resolver 110 being inserted into the cavity in the actuator 10 so that the notches 137a in the collar 137 engage and mate with the pin 138. The cylindrical portion 114 of the rotary housing 111 is caused to enter the opening 105 in rotary housing 100, and flange 112 is caused to engage the outer surface of the back plate 106, after which the openings for the bolts 113 are aligned, and the bolts 113 placed in position.

In order to assemble the rotatable and stationary parts of the resolver 110, the switches 117a and 117b may be provided with tapered rollers, to provide for axial movement between the rollers of the switches and the cam rings 144 and 145. This will permit the rollers of the switches to be depressed by rotating the cam rings slightly during the assembly operation.

We claim:

1. In combination,
    (a) an electric robotic actuator and a modular resolver affixed to said actuator for indicating the position of a movable portion of said actuator relative to a stationary portion of said actuator;
    (b) said actuator comprising a stationary first housing, a second housing rotatably supported by said first housing, rotating means for causing said second housing to controllably rotate relative to said first housing, said rotating means comprising a motor within said housings including a stator affixed to said first housing and a rotor, said rotor coupled to said second housing through a speed reducing deep cup harmonic drive mechanism, and said second housing having a covering back plate which is provided with a centrally disposed aperture;
    (c) said modular resolver comprising a first resolver portion and a second resolver portion, said modular resolver projecting at least partially into said housings through said centrally disposed aperture in said covering back plate of said second housing, removable resolver connecting means for affixing said first resolver portion to said covering back plate of said second housing, mounting means for rotatably mounting said second resolver portion relative to said first resolver portion and for maintaining said modular resolver portions in assembled relationship, slip-fit mating means which when mated rigidly connects said second resolver portion to said stationary first housing actuator portion, said modular resolver including a resolver stator affixed to said second resolver portion and a resolver rotor affixed to said first resolver portion and operable to provide an electrical signal which is an accurate indication of the rotation of said first resolver portion relative to said second resolver portion; and said modular resolver being readily removable and replaceable on said actuator by removing said removable resolver connecting means to free said first resolver portion from said covering back plate of said second actuator housing and then moving said modular resolver out of said aperture in said covering back plate to disengage said slip-fit mating means; whereby said resolver can readily be replaced without disassembling said actuator.

2. The combination of claim 1, and further comprising heat transferring means for transferring heat from within said actuator to the exterior thereof.

3. The combination of claim 2, said heat transferring means comprising a heat conductive back plate of said first housing, and gas circulating means for circulating gas through a closed air-circulation path within said housings, said closed air-circulation path providing flow past said rotor and said stator of said actuator motor and into contact with said heat conducting back plate for removing heat from said rotor and stator and transferring the removed heat to said heat conductive covering back plate of said first housing.

4. The combination of claim 3, said gas circulating means comprising a fan blade operatively affixed to a rotating member within said housings and said air-circulation path comprising passage means through said deep cup harmonic drive mechanism, said stationary first housing, and said rotating member.

5. The combination of claim 1, said electric actuator interiorly of said aperture in said covering back plate of said actuator second housing defining a cavity, said second resolver portion extending into said cavity in spaced relationship to said actuator other than at said slip-fit mating means.

6. The combination of claim 1, said second portion of said resolver including metal bellows means proximate said slip-fit mating means, said metal bellows means providing a zero backlash coupling which is elastically stiff in rotation but flexible in axial alignment so that stresses generated in said actuator are not transmitted to said resolver.

7. The combination of claim 1, wherein said second housing of said actuator is rotatably supported about said stationary first housing through rotational support means comprising first and second ball bearings, said first ball bearing located adjacent said covering back plate of said first housing and said second ball bearing located adjacent the end of said first housing remote from said back plate.

8. The combination of claim 1, said slip-fit mating means comprising axially engageable elements on said actuator first housing and said second resolver portion.

9. The combination of claim 4, and further comprising electromagnetic brake means for resisting rotation of said actuator second housing relative to said actuator first housing.

10. The combination of claim 9, said electromagnetic brake means having an annular brake disc non-rotationally affixed to said motor rotor, an annular brake shoe affixed to said first housing of said actuator axially of said brake disc, a backup ring affixed to said first housing axially of said brake disc and on the opposite side thereof from said brake shoe, means for continually urging said brake shoe towards said brake disc and towards said backup ring, and electric coil means for controllably urgings said brake shoe away from said brake disc to permit free rotation of said brake disc and said motor rotor with respect to said brake shoe and said first housing.

11. The combination of claim 10, and further comprising electric coil supporting means for supporting said electric coil means of said electromagnetic brake means on said stationary actuator first housing, and electric coil adjusting means for axially adjusting the position of said electric coil means.

12. The combination of claim 1, said modular resolver further comprising a limit switch, limit switch mounting means for mounting said limit switch on one said portion of said resolver, a cam ring, cam ring mounting means for mounting said cam ring on the other said portion of said resolver in juxtaposition with said switch, said cam ring being a split retaining ring, and said cam ring mounting means comprising a groove in a cylindrical element of said second portion.

13. An electric robotic actuator comprising a stationary first housing, a second housing rotatably supported about said first housing in coaxial relationship therewith, rotating means for rotating said second housing relative to said first housing, said rotating means comprising a stator on said first housing and a rotor on a rotating member within said housings, speed reducing harmonic drive means for drivably connecting said rotor to said second housing, and heat transferring means for transferring heat from within said actuator to the exterior thereof, said heat transferring means comprising a heat conductive back plate of said first actuator housing and gas circulating means for circulating gas within said housings from a source of heat energy to said heat conducting back plate, said gas circulating means comprising a fan blade affixed to said rotating member within said housings, and passage means providing an air-circulation path from said fan blade to said heat conducting back plate and return from said heat conducting back plate to said fan blade.

14. The actuator of claim 13, and further comprising a modular resolver for indicating the position of said second actuator housing relative to said stationary first housing, said resolver comprising a first portion and a second portion, said second portion rotationally mounted relative to said first portion and held in assembled relationship therewith, removable resolver connecting means for removably connecting said first resolver portion to said second actuator housing, slip-fit mating means for non-rotationally connecting said stationary first actuator housing and said second resolver portion, said modular resolver comprising a resolver stator on said second resolver portion and a resolver rotor on said first resolver portion in operative relationship therewith, said first resolver portion and said second resolver portion being removable from said coaxially supported actuator housings by disconnecting said removable resolver connecting means and said slip-fit mating means.

* * * * *